United States Patent
Napoletani et al.

(10) Patent No.: US 7,650,024 B2
(45) Date of Patent: Jan. 19, 2010

(54) DISSIPATIVE FUNCTIONAL MICROARRAYS FOR CLASSIFICATION

(75) Inventors: Domenico Napoletani, Fairfax, VA (US); Daniele Carlo Struppa, Irvine, CA (US); Timothy DuWayne Sauer, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 778 days.

(21) Appl. No.: 11/422,720

(22) Filed: Jun. 7, 2006

(65) Prior Publication Data

US 2006/0291728 A1 Dec. 28, 2006

Related U.S. Application Data

(60) Provisional application No. 60/687,868, filed on Jun. 7, 2005, provisional application No. 60/764,790, filed on Feb. 3, 2006.

(51) Int. Cl.
*G06K 9/00* (2006.01)
*G06K 9/46* (2006.01)
*G06K 9/62* (2006.01)

(52) U.S. Cl. .................. 382/128; 382/190; 382/224

(58) Field of Classification Search ......... 382/128–134, 382/190–194, 224–229, 165, 170, 181; 128/922
See application file for complete search history.

(56) References Cited

U.S. PATENT DOCUMENTS 6,136,541 A * 10/2000 Gulati ........................ 435/6
2006/0053005 A1 * 3/2006 Gulati ........................ 704/226

* cited by examiner

*Primary Examiner*—Samir A. Ahmed
*Assistant Examiner*—Mehdi Rashidian
(74) *Attorney, Agent, or Firm*—David Yee

(57) ABSTRACT

The invention provides for a technique of extracting information from signals by allowing a user to select a classifier and a figure of merit for quantifying classification quality; select a transform to generate features from input data; use a recursive process of functional dissipation to generate dissipative features from features that are generated according to the transform; search for one or more dissipative features that maximize the figure of merit on a training set; and classify a test set with the classifier by using one or more of the dissipative features. Functional dissipation uses the transforms recursively by generating random masking functions and extracting features with one or more generalized matching pursuit iterations. In each iteration, the recursive process may modify several features of the transformed signal with the largest absolute values according to a specific masking function.

18 Claims, 12 Drawing Sheets

US 7,650,024 B2

DISSIPATIVE FUNCTIONAL MICROARRAYS FOR CLASSIFICATION

CROSS REFERENCE TO RELATED APPLICATIONS

The present application claims the benefit of provisional patent application Ser. No. 60/687,868 to Napoletani et al., filed on Jun. 7, 2005, entitled "Wavelet Microarrays for Binary Classification," and provisional patent application Ser. No. 60/764,790 to Napoletani et al., filed on Feb. 3, 2006, entitled "Dissipative Functional Microarrays for Classification of Crystallization Patterns," which are hereby incorporated by reference.

GOVERNMENT LICENSE RIGHTS

The U.S. Government has a paid-up license in this invention and the right in limited circumstances to require the patent owner to license others on reasonable terms as provided for by the terms of Grant No. 600,172 awarded by the Department of Education.

DETAILED DESCRIPTION OF THE INVENTION

Figure 1:
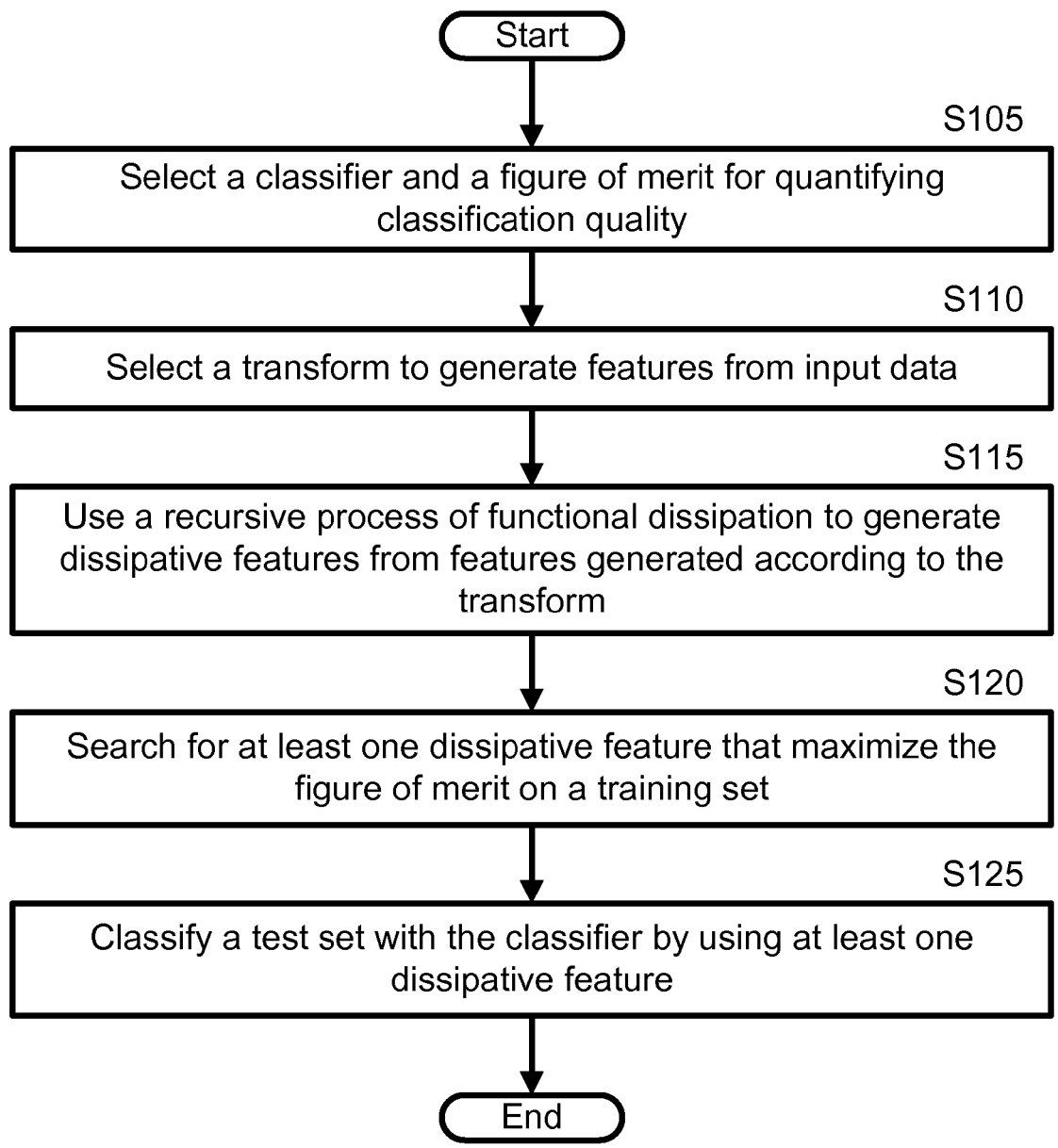
FIG. 1 shows an example of a flow diagram of feature enhancement and classification instructions as one embodiment of the invention.

The invention embodies a technique for extracting information from signals for enhancing classification of high-resolution, texture rich data.

I. Introduction

Pattern classification often constitutes two distinct phases: (1) the identification of a possibly small set of significant, quantitative features in the pattern, and (2) the application of a learning algorithm to the features. If the feature extraction process is not robust, then the success of the learning algorithm may be limited. However, after the feature space is properly identified, there may be a choice of standard learning algorithms that can be applied. Examples include support vector machines, neural networks, and k-neighborhood algorithms.

Yet, such standard learning algorithms may not be suitable for classifying patterns that tend to have a strong variability when generated in different conditions. In these circumstances, a type of classification algorithm premised upon a microarray paradigm may be used.

In particular, a dissipative functional microarray is introduced. The dissipative functional microarray is a feature enhancement algorithm that is inspired by experimental microarray techniques.

The idea behind the use of microarrays is that if a data set that is large and/or diverse enough can be collected on a phenomenon, it is often possible to answer many questions, even when no specific data interpretation is known. As one advantage, the functional dissipative algorithm appears suitable for high resolution, texture-rich data. Additionally, it may bypass the need to preprocess with specialized feature extraction algorithms. Furthermore, it may potentially be used as an intermediate feature enhancement step in any classification scheme.

The functional dissipative algorithm is based upon an unconventional use of matching pursuit. More precisely, random masking functions (where "random masking functions" is also referred to herein as "masks") may be generated. Features may be extracted using one or more generalized matching pursuit iterations. In each iteration, a recursive process may modify several of the largest coefficients (where "largest coefficients" is also referred to herein as "largest features") of the transformed signal according to the masking function. In this way, the matching pursuit is tends not to be a pursuit at all. Rather, it tends to be more of a slow, controlled dissipation of the structure of a signal. This process may be referred to as functional dissipation. The notion is that some unknown statistical feature of the original signal can be detected in the dissipation process at least for some of the random maskings.

This process is apparently striking in that, individually, each feature extraction with masking may become unintelligible because of the added randomness and dissipation. Further, it may be the case that only a string of such feature extractions can be "blindly" used to some effect. This method can be seen also as a new instance of ensemble classifiers (e.g., boosting and bagging) in that several functional dissipations may be pulled together to achieve improvement of classification results.

Other applications of matching pursuit to classification problems include, but are not limited to, kernel matching pursuit methods and boosting methods. Such methods may be interpreted essentially as greedy matching pursuit methods where the choice of "best" coefficient (where "coefficient" is also referred to herein as "feature") at each iteration is made with respect to more sophisticated loss functions than in the standard case. However, while the approach may use the structure of matching pursuits, only their rich dynamical properties may be used for the generation of features. The reason is that the whole iterative process of extracting coefficients may simply become and instance of a non-linear iterative map, disjoined from approximation purposes.

For instance, the microarray-based classification algorithm may be used to classify crystallization patterns of amino acid affected by the addition of small quantities of proteins. In such case study, these quantities are referred herein as a set of crystallization droplets. The goal of classification is to be able to recognize whether an unknown solution contains one or more of several proteins in a database. One difficulty is that crystallization patterns may be significantly affected by laboratory conditions, such as temperature and humidity. Hence, the degree of similarity of patterns belonging to the same protein may be subject to some variations. However, when the method is applied to the crystallization data, what can be shown is how a sufficiently large number of different functional dissipations can greatly improve the misclassification error rates, even in a difficult situation where a single amino acid is used.

This case study may be seen as an instance of texture classification. It is well established that wavelets and moments of wavelet coefficients can be very useful for these types of problems. Therefore, the method may be implemented in the context of a wavelet image transform. The information obtained with the functional dissipation with moments of the extracted coefficients may be seen as summarized herein. It should be noted that since the method can be formulated in a general setting, other choices of transforms and statistics are possible as well.

Referring to the figures, FIG. 1 shows a tangible computer readable medium having feature enhancement and classification instructions. Basic instructions include selecting a classifier and a figure of merit for quantifying classification quality S105; selecting a transform to generate features from input data S110; using a recursive process of functional dissipation to generate dissipative features from features that are generated according to the selected transform S115; searching for at least one of the dissipative features that maximize the figure of merit on a training set S120; and classifying a test set with the classifier by using at least one of the dissipative features S125.

The tangible computer readable medium can be any component that can carry instructions to be executed in a device, which may have a memory. Examples of a tangible computer readable medium include, but are not limited to, compact disc (CD), digital video disc (DVD), flash memory, floppy diskette, personal digital assistant (PDA), etc.

Input data can be any type of data (such as images and time series) that is high in resolution and/or is texture-rich. Nonlimiting examples of images include biological images, environmental images, geological images, chemical images, etc. Specific examples of high resolution, texture-rich data include, but are not limited to, images of crystallization patterns, data from biomedical applications (such as retina images and histological samples), and data from remote sensing (such as satellite images of landscapes). For time series, appropriate high resolution data include, but are not limited to, high frequency financial time series, time series of biological signals (such as EEG), and remote sensing time series.

These instructions may allow input data to be divided into a training set and a test set. The training set may be defined as a currently existing database (e.g., images previously collected). The test set may be defined as the data presented to the user for classification (e.g., experimental/test data).

Further, these instructions permit a user to select a transform to be applied onto the input data. Examples of transforms include, but are not limited to, wavelet transforms, wavelet-like transforms, Fourier transforms, a combination of two or more transforms, etc. It may even be the case where the transform alternates between two or more discrete wavelet transforms. Each discrete wavelet transform may have a different mother wavelet. For instance, the transform may alternate between a Haar discrete wavelet transform and a Daubechies discrete wavelet transform.

Figure 2:
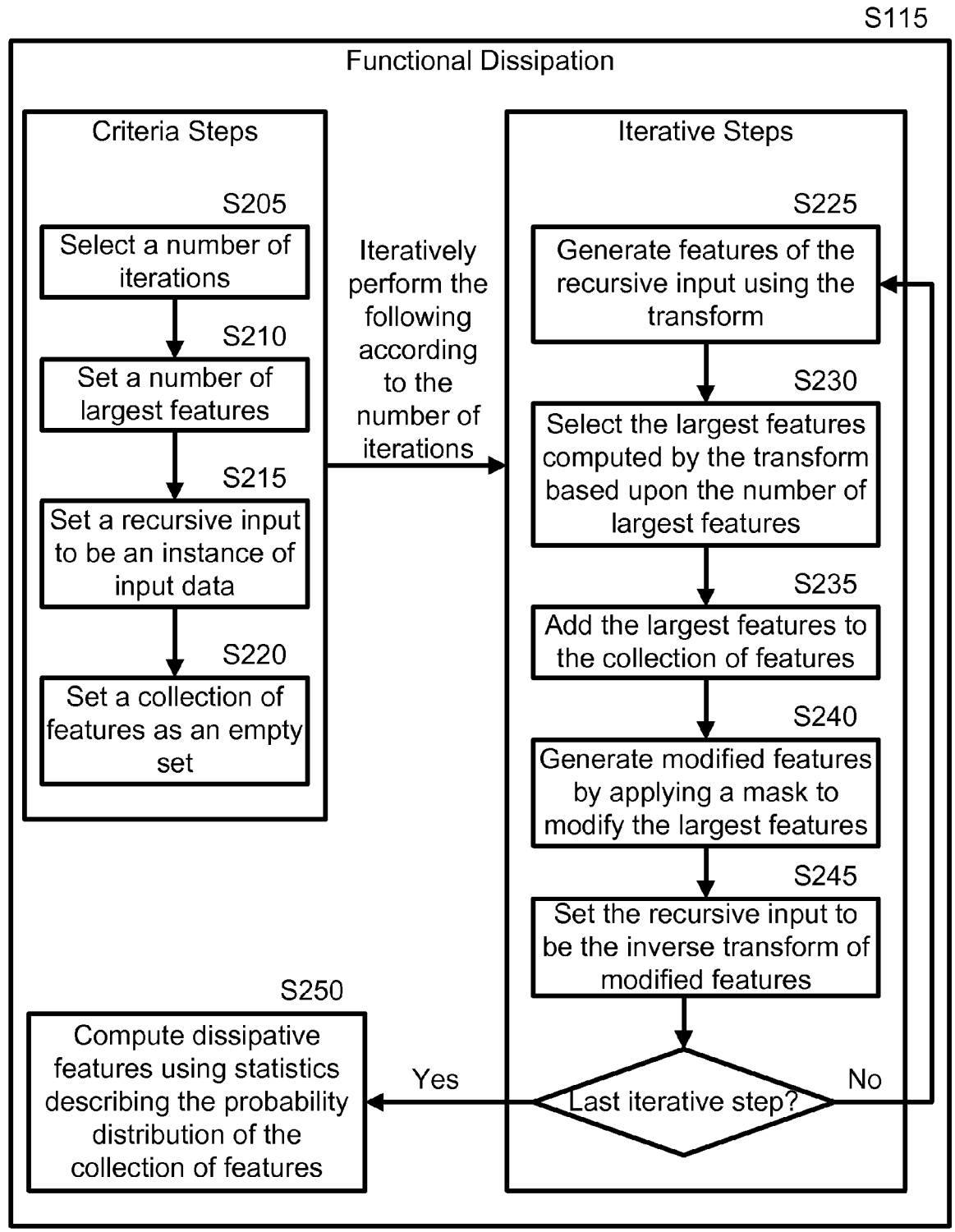
FIG. 2 shows an example of a flow diagram of functional dissipation as one embodiment of the invention.

As shown in FIG. 2, functional dissipation S115 may include a multitude of steps. Each of the following criteria steps may be performed in no particular order. A number of iterations may be selected S205. A number of largest features may be set to determine how many of the largest features are to be extracted for recursion S210. A recursive input may be set as an instance of the input data S215. A collection of features may be set as an empty set S220.

Figure 3:
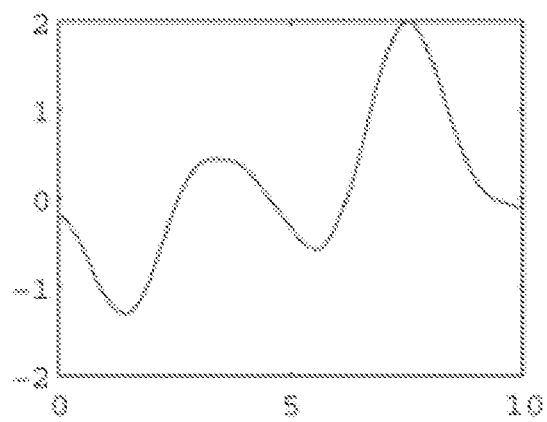
FIG. 3 shows examples of masks used in algorithm (E1)-(E3).
Figure 3:
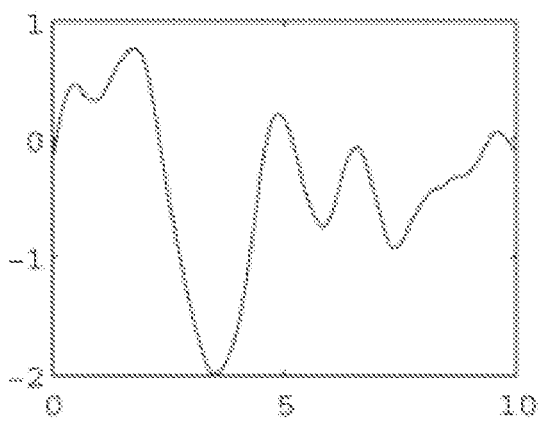
Figure 3:
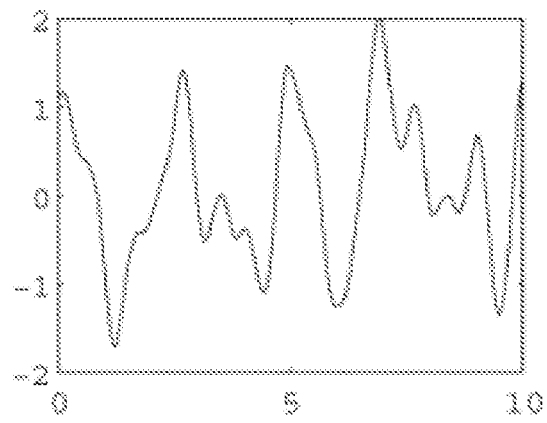
Figure 3:
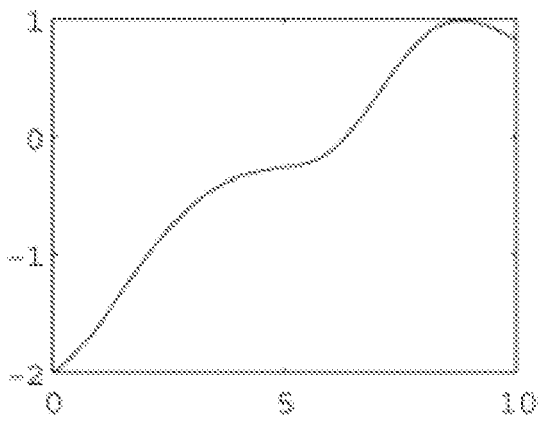

After performing the criteria steps, functional dissipation continues iteratively according to the selected number of iterations with the following steps. Features of the recursive input may be generated by using the transform S225. From among those generated, the largest features computed by the transform may be selected based upon the earlier-established desired number of largest features S230. Those that are selected may be added to the collection of features S235. A mask may be applied to the largest features S240. Such application may generate modified features by modifying the largest features. Examples of masks (also referred to as "masking functions") may be seen in FIG. 3. The recursive input may be set to be the inverse transform of the modified features S245. These steps may be repeated according to the selected number of iterations.

Once the iterative steps have been accomplished, functional dissipation may continue with computing the dissipative features by using statistics that describe the probability distribution of the collection of features S250. The statistics may include at least one statistical moment. Other types of statistics include, but are not limited to, random samplings, parameters, means, medians, variances, standard deviations, frequency distributions, Chi square tests, parameterization of the full density function, etc.

As an embodiment of the invention, functional dissipation may be repeated at least once for a multitude of masks. Each of the masks may be randomly selected.

As another embodiment, each mask may be a realization of a low variance Gaussian white noise convolved with low-pass filters of different frequency supports.

Nonlimiting examples of classifiers include a linear discriminant analysis classifier, a support vector machine, a nearest neighborhood classifier and a neural network.

Optionally, the classifier may include binary coding. The binary coding may attach to each data class value of "1" if dissipative features of the input data belonging to the data class are significantly different from those of a control data class. Otherwise, a value of "0" may be attached.

Figure 4:
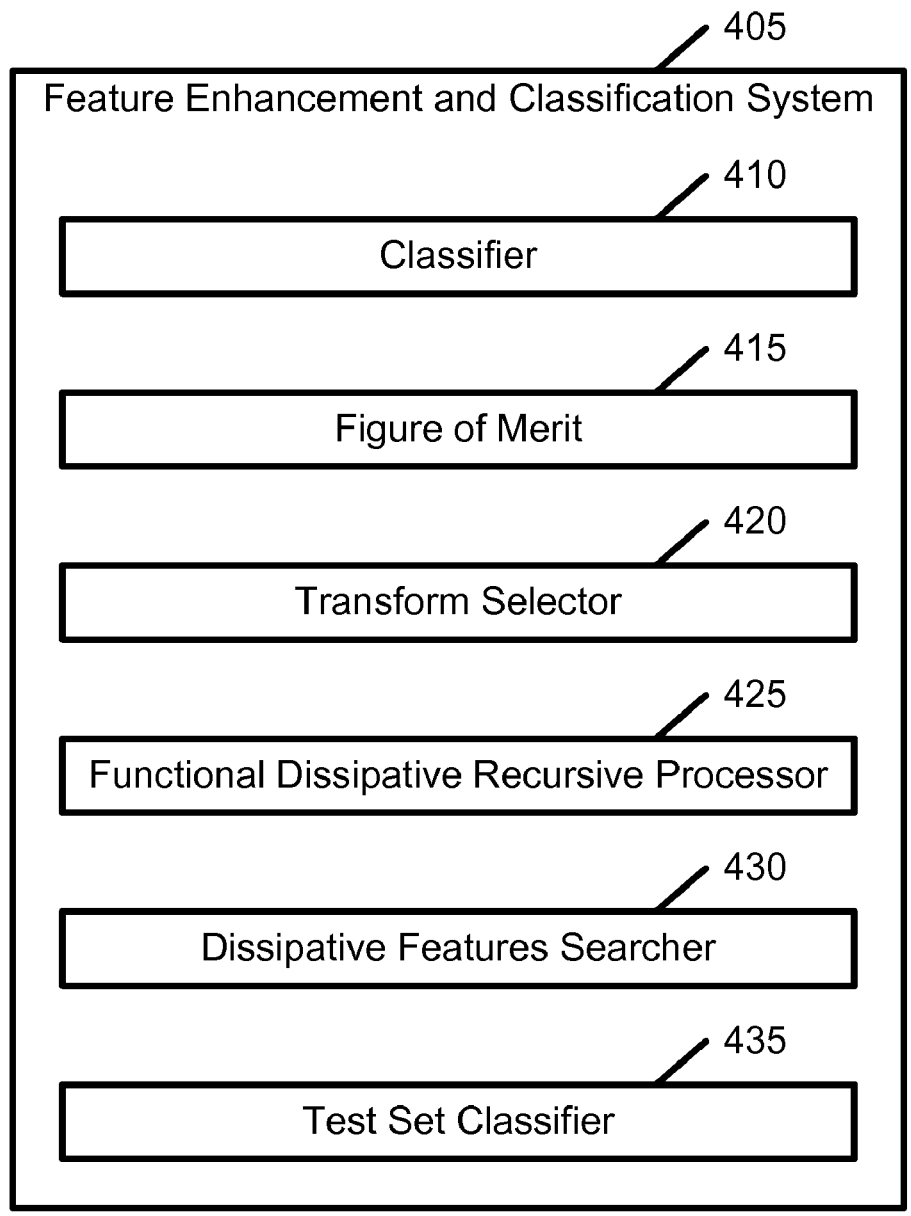
FIG. 4 shows an example of a block diagram of a feature enhancement and classification system.

As shown in FIG. 4, a feature enhancement and classification system 405. This system 405 may be established to perform the aforementioned feature enhancement and classification instructions. A basic system may include a classifier 410; a figure of merit 415; a transform selector 420; a functional dissipative recursive processor 425; a dissipative features searcher 430; and a test set classifier 435.

The classifier 410 may be configured to quantify classification quality. Nonlimiting examples of classifiers include a linear discriminant analysis classifier; a support vector machine; a nearest neighborhood classifier; and a neural network.

Optionally, the classifier 410 may also include binary coding. Binary coding may attach to each data class a value of "1" if dissipative features of input data belonging to the data class are significantly different from those of a control data class. Otherwise, a value of "0" may be assigned.

Just as the classifier 410, the figure of merit 415 may be configured to quantify classification quality.

The transform selector 420 may be configured to select a transform to generate features from input data. As stated above, input data may be high resolution, texture-rich data that is capable of being divided into said training set and said test set. Also, a multitude of transforms may be used. Nonlimiting examples of a transform include wavelet transforms, wavelet-like transforms, Fourier transforms, a combination of two or more transforms, etc. It may even be the case where the transform alternates between two or more discrete wavelet transforms. Each discrete wavelet transform may have a different mother wavelet. For instance, the transform may alternate between a Haar discrete wavelet transform and a Daubechies discrete wavelet transform.

The functional dissipative recursive processor 425 may be configured to generate dissipative features from the features generated according to the transform.

The dissipative features searcher 430 may be configured to search for one or more dissipative features that maximize the figure of merit on a training set.

The test set classifier 435 may be configured to classify a test set with the classifier 410 by using one or more dissipative features.

Figure 5:
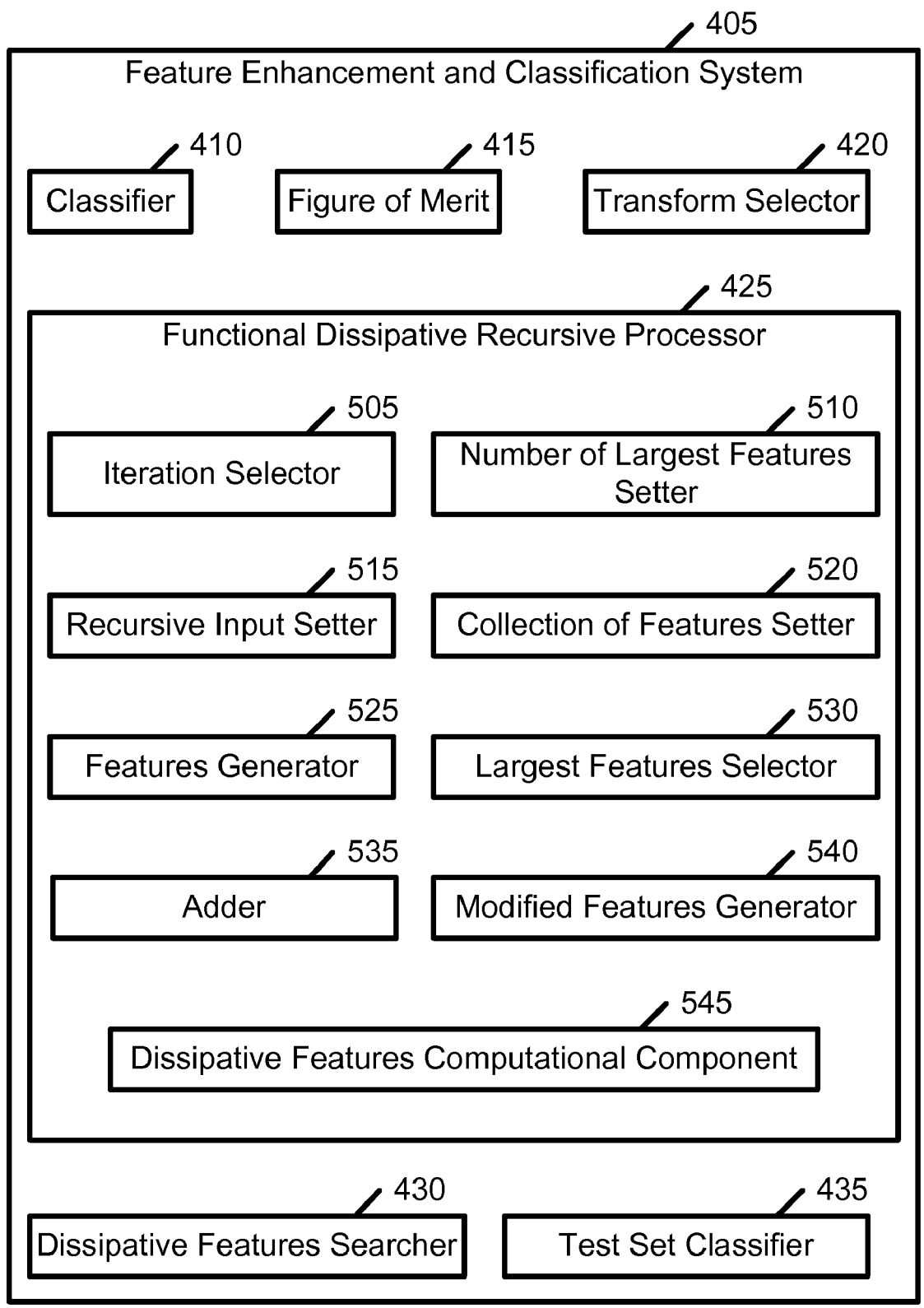
FIG. 5 shows another example of a block diagram of a feature enhancement and classification system.

In the system, as shown in FIG. 5, functional dissipative recursive processor 425 may include an iteration selector 505; a first largest features selector 510; a recursive input setter 515; a collection of features setter 520; a features generator 525; a second largest features selector 530; an adder 535; a modified features generator 540; and a dissipative features computational component 545.

The iteration selector 505 may be configured to select a number of iterations. This number is to command how often functional dissipation process should be repeated.

The number of largest features setter 510 may be configured to set a number of largest features.

The recursive input setter 515 may be configured to set a recursive input to be an instance of input data.

The collection of features setter 520 may be configured to set a collection of features as an empty set.

The features generator 525 may be configured to generate features of the recursive input using the transform.

The largest features selector 530 may be configured to select the largest features computed by the transform. The number of largest features to be selected is determined by the number of largest features setter.

The adder 535 may be configured to add the largest features that are selected to the collection of features. Once added, the empty set should no longer be empty.

The modified features generator 540 may be configured to generate modified features by applying a mask to modify the largest features.

The dissipative features computational component 545 may be configured to compute dissipative features using statistics describing the probability distribution of the collection of features. The statistics may be one or more statistical moments.

As one embodiment of the invention, functional dissipation may be repeated one or more times for a multitude of masks. Each mask may be randomly selected. As another embodiment, the mask may be a realization of a low variance Gaussian white noise convolved with low-pass filters of different frequency supports.

II. Classification Algorithms

The basic approach is to derive long feature vectors for each input data, but in an unusual way. Since the input data patterns may be generated by stochastic processes, there may be a great local variability and any significant feature may need to encode statistical information about the image to be part of a robust classifier. Hence, the use of moments of a suitable expansion of the images as features may be utilized.

A. Functional Dissipation Algorithm

Implementation of feature enhancement and classification may begin with input data divided into a training set and a test set. However, this step is optional because a training set of the input data may already be in place. Whether the input data is to be divided or not, the following four steps may then be applied. In step one, a classifier and a figure of merit that quantifies the classification quality may be selected. In step two, a basic method of generating features from the input data may also be selected. Following this latter selection, in step three, dissipative features may be generated by a recursive process of functional dissipation. In step four, for a fixed integer k, k features may be searched in the feature space defined in step three. These features may maximize the figure of merit in step one on the training set. In step five, to classify the test set, the classifier from step one may be applied by using the optimal k features from step four.

A nonlimiting example of a classifier in step one is a linear discriminant analysis classifier. This method may come with a built-in figure of merit, which may serve as the ratio of the between-group variance to the within-group variance. More sophisticated classifiers often have closely associated evaluation parameters. Cross-validation or leave-one-out error rates may also be used.

The key to the functional dissipation algorithm is step three. Typically, methods for generating features depend on the input data. For two-dimensional images, orthogonal and near-orthogonal transform coefficients may be used. Here, a new method of extracting information from images, called "functional dissipation," may be used.

Functional dissipation is generally and surprisingly effective (such as in case studies of droplet images). It is based on an image transform. However, it uses the transform recursively to uncover important features.

The functional dissipation method may serve as a way to leverage a feature extraction method (such as an image transform) to generate more interesting and varied features. For example, consider a single input datum X and one or more invertible transforms $T_i$ that can be applied to X, where i= 1, ..., K. X may represent a 256 by 256 gray scale image and $T_i$ may represent the Discrete Wavelet Transform.

Random maskings may be generated; features with several generalized matching pursuits may be extracted. In each pursuit, the recursive process may modify several coefficients of the best elements of the dictionary according to the masking function. In this way, the matching pursuit may actually not be a pursuit at all. Rather, it may be a slow, controlled, dissipation of the structure of the signal. The idea is that some unknown statistical feature of the original signal may be detected in the dissipation process at least for some of the random maskings. Individually, each feature extraction with masking may become unintelligible because of the added randomness and dissipation. It is likely that only a string of such feature extractions can be "blindly" used to some effect in classification.

There may be some similarity between the functional dissipation approach and random projections reconstruction approach. However, the difference between the two is that the former may allow several distinct randomization processes to be used effectively by the nonlinear interaction of input data and mask. Additionally, the functional dissipation method generally does not focus on reconstruction issues. Rather, it tends to focus on classification and event detection problems.

For instance, let A(x) be a real-valued function defined on the real line IR, which may be called "mask" or "masking function." At each iteration, several coefficients from the input datum X may be extracted. The initial collection of coefficients C, which may be selected by the algorithm to be the empty set, may be set. The following functional dissipation steps (E1)-(E3) may be applied K times. Also, positive integers K and M may be fixed; $X_1$ may be set as $X_1=X$.

For i=1, ..., K, (E1): Compute the transform $T_iX_i$.

(E2): Collect the largest M coefficients C(m), where m=1, ..., M of $T_iX_i$ with the largest absolute value. Add this set of coefficients to the set C.

(E3): Apply the mask by setting C'(m)=A(|C(m)|)C(m) and modifying the corresponding coefficients of $T_iX_i$ in the same fashion. Set $X_{i+1}=T_i^{-1}(T_iX_i)'$ to be the inverse of the modified coefficients $(T_iX_i)'$.

At the conclusion of the K steps, features may be generated by computing statistics that describe the probability distribution of the set C. For example, one could use m(h), where h=2, 3, 4 are the set's second, third and fourth moments respectively. These statistics may be used as features, delivered by the means of functional dissipation. By carrying out these steps for N different masks $A_n$, a 3N-dimensional feature vector may be obtained for each data input.

One way to view this approach is through the generalization of a greedy regression strategy known as "matching pursuit." However, the matching pursuit would be based on and used in a new and unusual way. In general, matching pursuit is used to find good suboptimal approximations to a signal. This finding may be achieved by expanding a function $f$ in some dictionary $D=\{g_1, \ldots, g_p\}$ and by choosing the element in the dictionary $g_i$ for which $|<f, g_i>|$ is maximum. Given an initial approximation of $\tilde{f}=0$ of $f$, and an initial residue $Rf=f$, the following may be set: $\tilde{f}=\tilde{f}+<f, g_i>g_i$ and $Rf=Rf-<f, g_i>g_1$. The process may be repeated on the residue several times to successively extract different relevant structures from the signal.

In each iteration of the algorithm, several of the largest coefficients of the transformed signal according to the random masking functions may be modified. Modification may focus only on the non-linear interaction of the signal with the masking function (instead of the approximation of the underlying signal). The residue may be perturbed more and more until, in the limit, no structure of the original signal is visible in either $Rf$ and $\tilde{f}$. Effectively, the result may be a slow, controlled dissipation of the structure of the signal.

The key point is that the dissipation process tends to highlight hidden statistical features of the original signal.

Functional dissipation tends to show that there may be an intrinsic power in the matching pursuit algorithm that is not fully exploited in its more traditional applications. As evidence, it is possible to prove interesting dynamical properties for the residue that are, in principle, not limited to this simple type of greedy regression. For instance, $|<f, g_i>|$ may be substituted in the iteration with some suitable function of it and still be expected to generate interesting dynamics for the behavior of the residue. Moreover, some of the most powerful data analysis algorithms, which may be called as "boosting methods," can be interpreted essentially as an attenuated greedy regression when the choice of best coefficient at each level is made with respect to more sophisticated criteria than the absolute value of the coefficients.

B. Binary Coding

Optionally, classification using functional dissipation may incorporate a binary coding. Simply, to each data class, a value of "1" may be assigned to dissipative features (i.e., features that are enhanced with a recursive process of functional dissipation) of input data belonging to the data class are significantly different from those of a control data class. For all other scenarios, a value of "0" may be assigned.

III. Experiments

To exemplify the viability of the function dissipative algorithm, the algorithm was performed on a sampling of proteins, amino acids and water. Input data from any one or a combination of these elements may be viewed in droplets.

Four proteins are used: albumin from chicken egg white, hemoglobin from bovine blood, lysozyme and albumin from bovine serum. Each of these may be respectively denoted as P1, P2, P3 and P10.

The control solution without protein will be denoted as Water.

The proteins are mixed with 4 amino acids: leucine, lysine, phenylalanine and methionine. Each of these amino acids may be respectfully denoted as A2, A7, A13 and A17.

Twenty gray-scale images of crystallization patterns for each combination of amino acids A2, A7, A13, A17 with proteins P1, P2, P3, P10 and with Water were used. For each droplet $X_{i,j,a}$, (e.g., the i-th instance of protein j with the addition of amino acid a), the size of the image to a matrix of 256 by 256 pixels may be reduced. The image may also be normalized so that its mean as an array is zero and its variance is one.

It is important to note that the experiments neither limits the number of proteins to classify nor the number of amino acids used. Rather, both numbers can increase in practice. The experiments restrict the analysis to four proteins and four amino acids for various reasons. For example, one reason involves ongoing experimentations with new amino acids. Another reason is that some droplet sets are not yet available in large numbers for computational experimentation. A further reason for this restriction is that it is self-imposed to show the ability to classify proteins with a small set of amino acids.

It is also important to note that while droplet patterns may be based on a binary code can be very effective in visual inspection classification, this step is not necessary in functional dissipation.

It is also important to note that the masking functions of (E1)-(E3) may be used somewhat arbitrarily in this experiment. Several realizations of a low variance Gaussian white noise may be used. These realizations may be convolved with low-pass filters of different frequency supports. The process may be repeated N times to generate curves of the type exemplified in FIG. 3.

Even thought the specific process of generation of the random masks may be arbitrary, the guiding idea is to have sufficient variability in the masks themselves while preserving some of the structure of the original signal from one iteration to the next. To this extent, the masking functions may be designed to assume relatively small values so that the image is only slightly affected at each iteration by the change of a subset of its coefficients. The results produced, at least preliminarily, tend to hold, even when the maskings are allowed to have larger variations, as long as not too many coefficients are altered at each iteration. It is well within the scope of this invention that a wide range of possible maskings are suitable and may be used.

Figure 6:
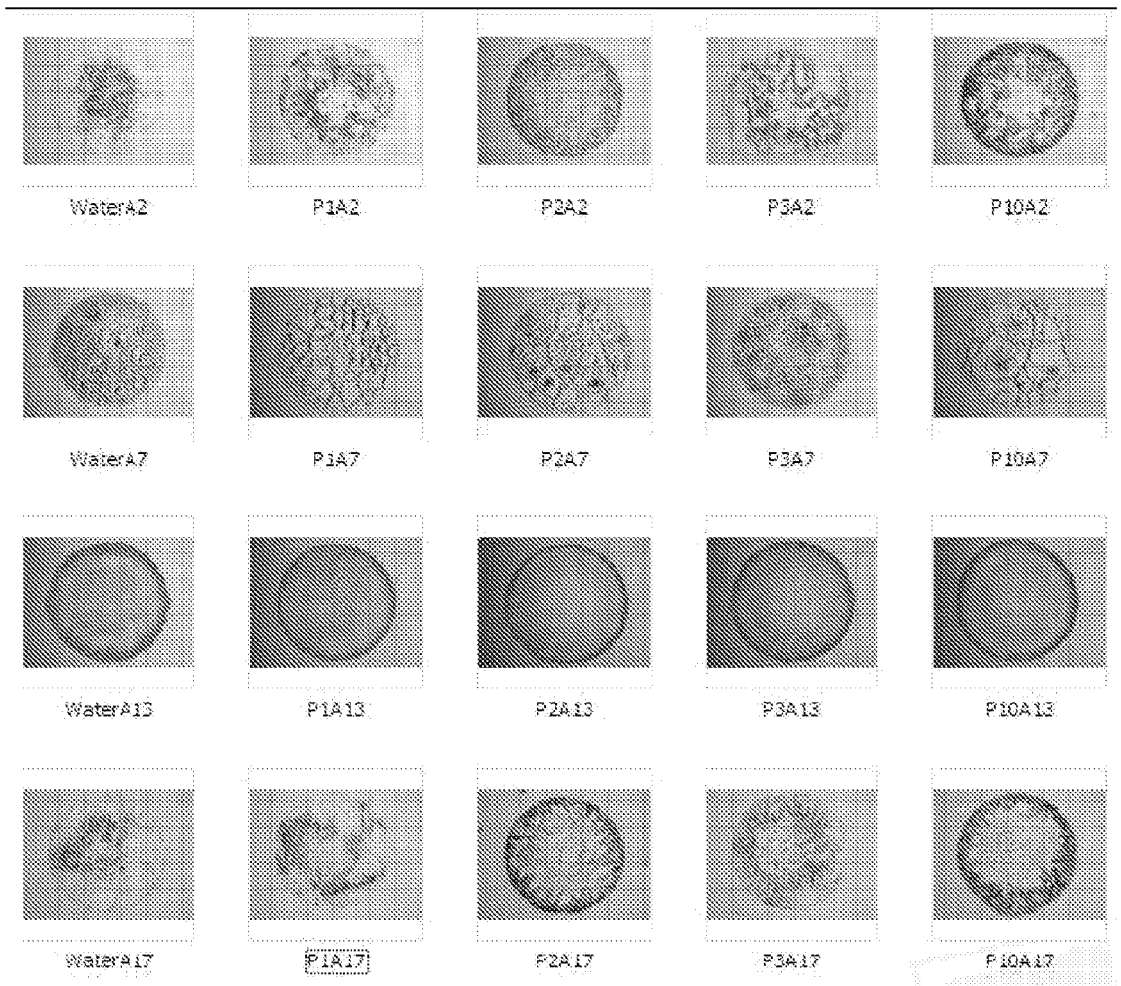
FIG. 6 shows an exemplified array of images showing representative patterns of an amino acid solution with either a protein or water.
Figure 7:
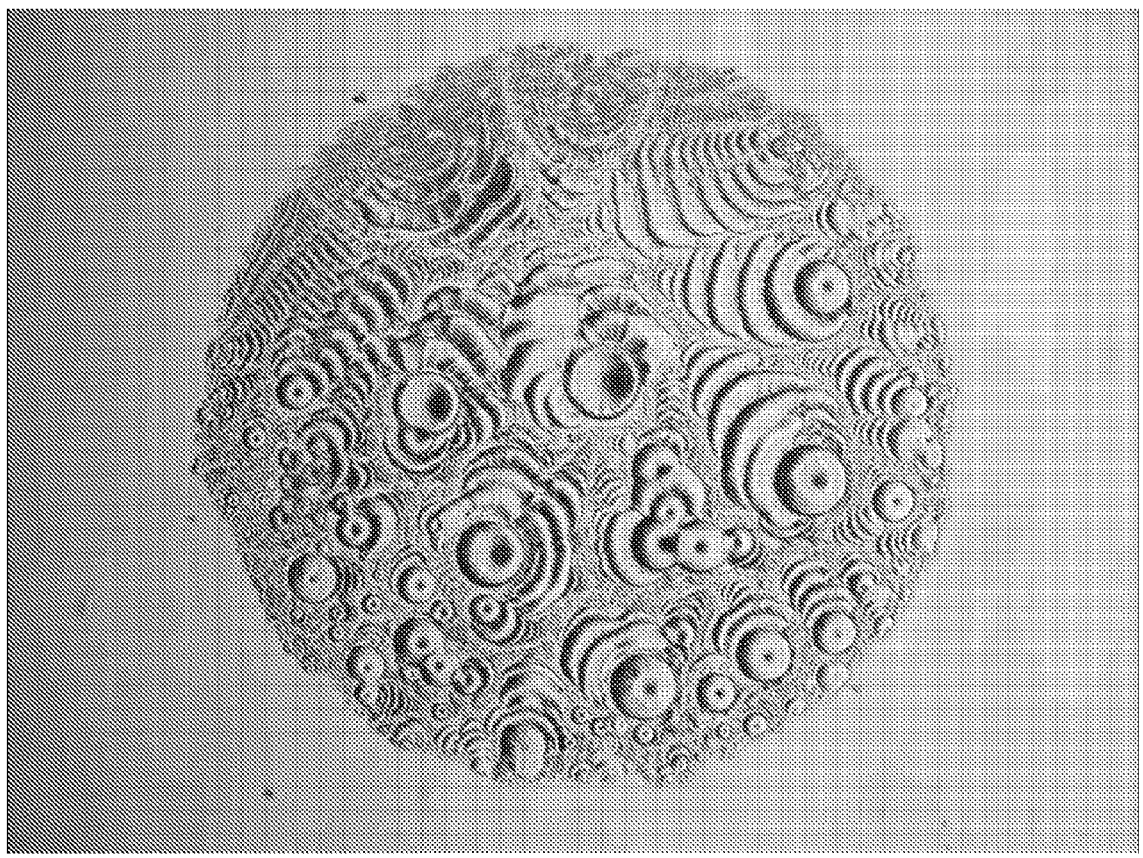
FIG. 7 shows an example of a crystallization pattern of an image droplet of Water+A7.
Figure 8:
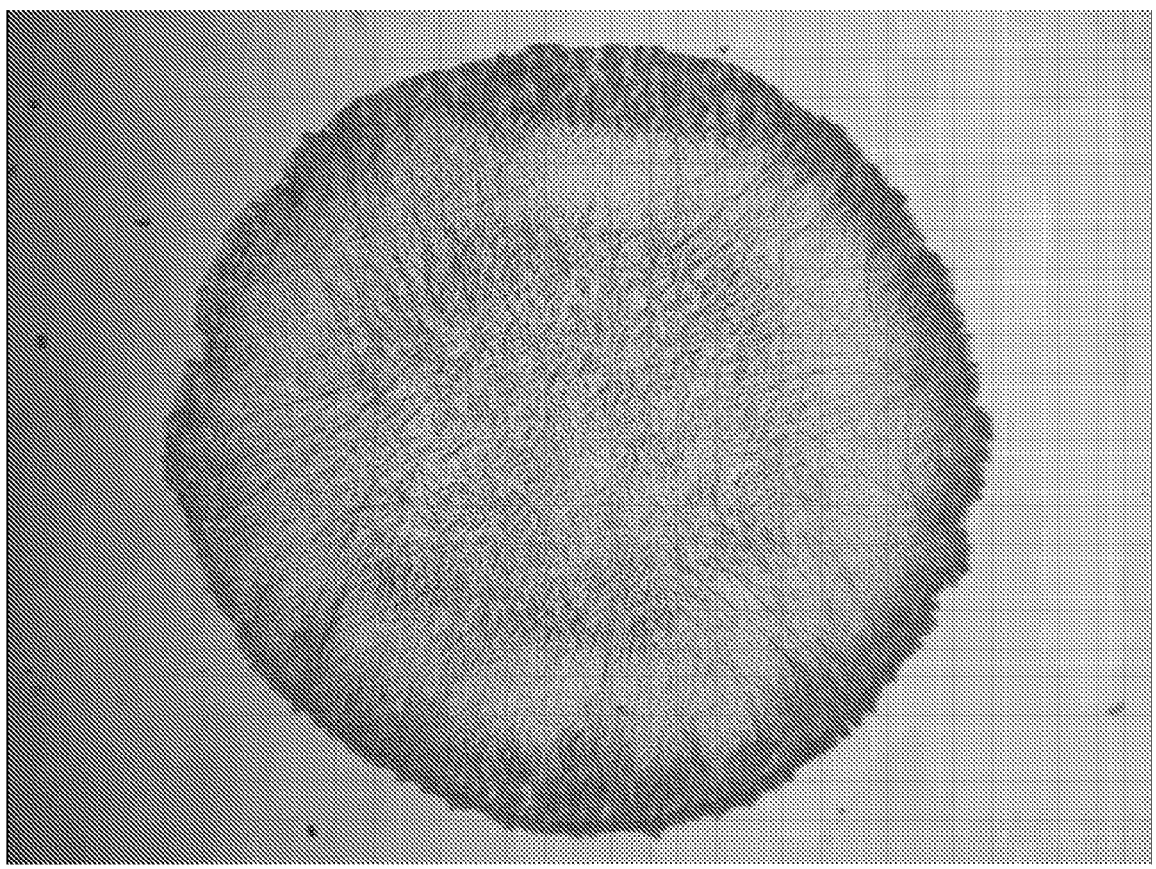
FIG. 8 shows an example of a crystallization pattern of an image droplet of Water+A13.
Figure 9:
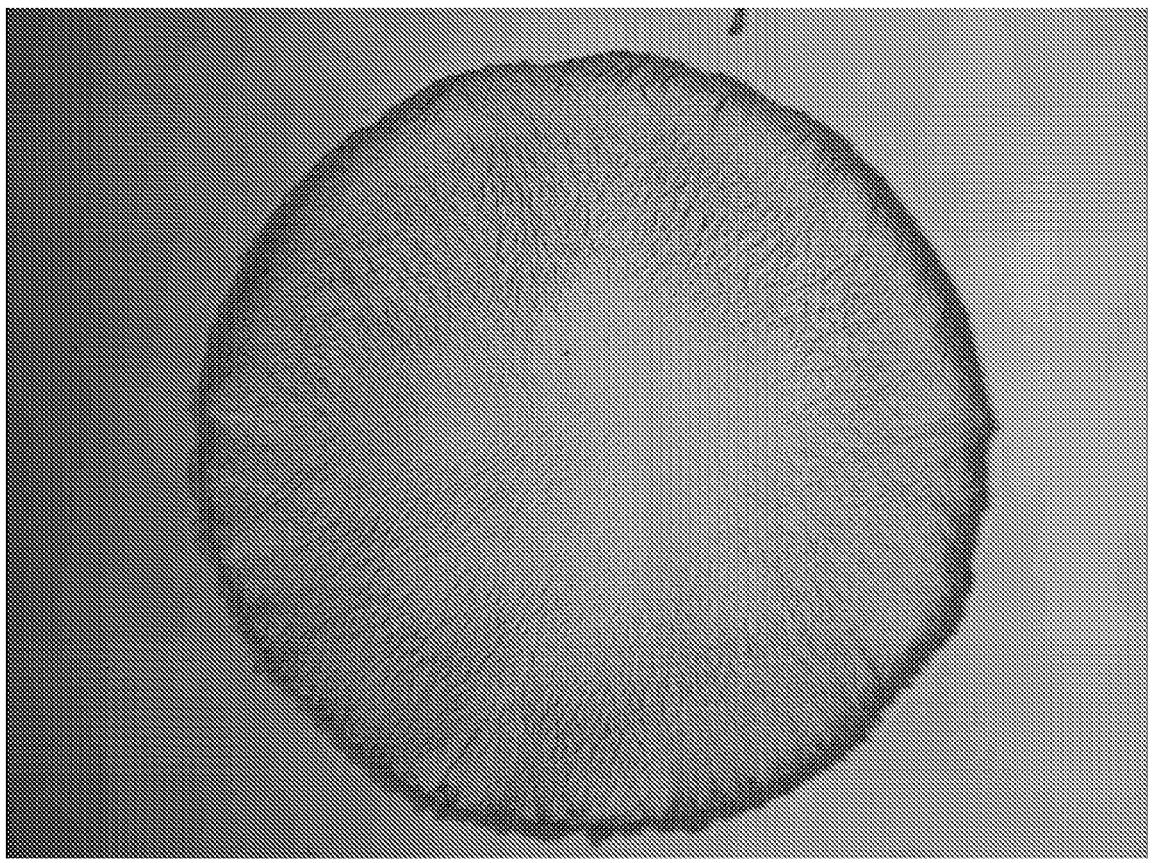
FIG. 9 shows an example of a crystallization pattern of an image droplet of P2+A13.
Figure 10:
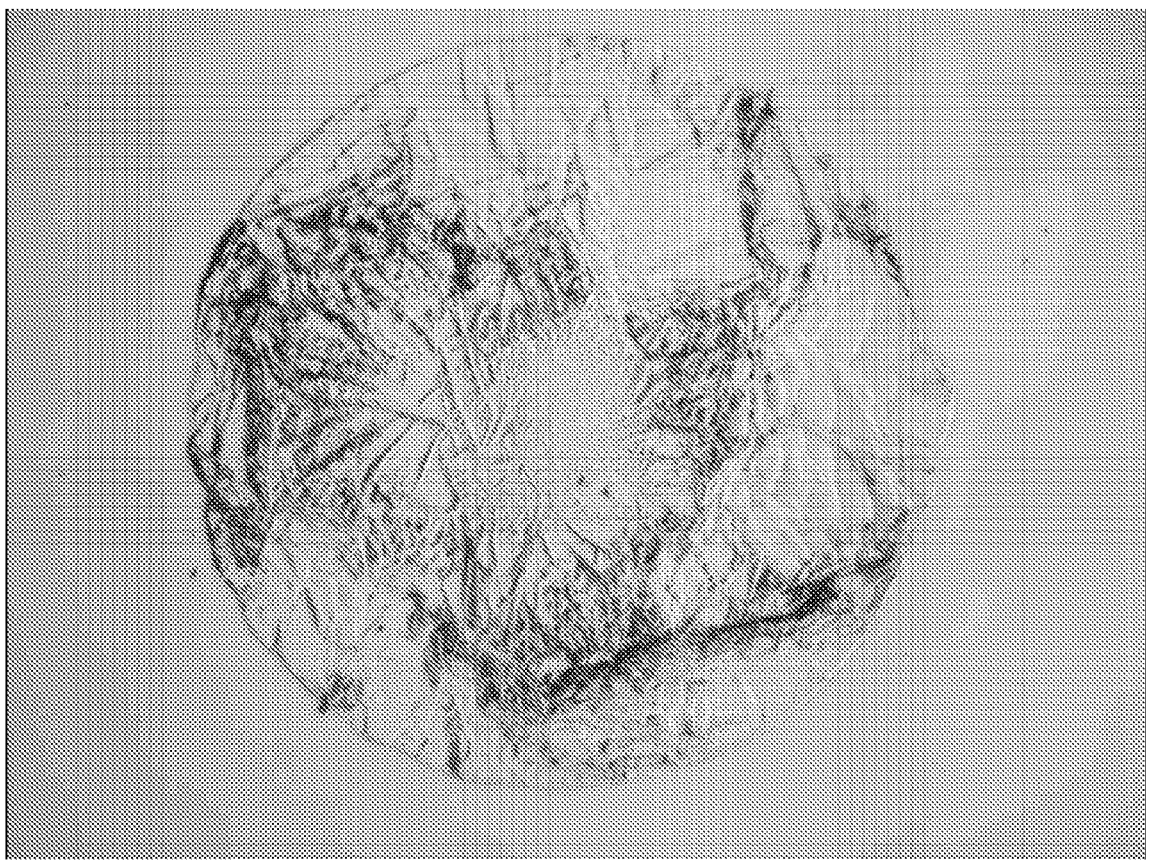
FIG. 10 shows an example of a crystallization pattern of an image droplet of P1+A17.

In FIG. 6, each row shows (from left to right) representative patterns of four amino acid (A2, A7, A13, A17) solutions with either one of four proteins (P1, P2, P3, P10) or water added. FIGS. 7-10 show full size images of some representative droplets to fully appreciate their complexity. FIG. 7 shows a typical crystallization pattern of Water+A7. FIG. 8 shows a typical classification pattern of Water+A13. FIG. 9 shows a typical classification pattern of P2+A13. FIG. 10 shows a typical classification pattern of P1+A17. Note that the structures in FIGS. 8 and 9 (which are distinct in spatial distribution and type) may be very fine, and maybe only very sensitive tools may be able to detect and use such information.

A. Functional Dissipation Algorithm

For purposes of comparison, the algorithm with and without the advantage of functional dissipation is applied. The parameter K is set to one. The number of iterations of steps (E1)-(E3) is set to greater than one.

The transforms $T_i$ in steps (E1)-(E3) are set to be discrete wavelet transforms with Haar mother wavelet for odd values of i and Daubechies mother wavelet with 10 vanishing moments for even values of i. The wavelet transforms may be computed up to coefficients of level d=5.

The masking functions used are the Gaussian processes described herein. The domain of the masks were restricted to be some fixed interval [0, R]. Where R is sufficiently large (e.g., 10), the specific value is not likely to affect the quality of the classification in any significant way. In the cases where the largest wavelet coefficients are generated by the algorithm outside the specified domain, the mask may be periodically extended as necessary.

In implementing steps (E1)-(E3), two or more different wavelet transforms may be alternated. Alternation may assure that, even though orthonormal transforms may be used, there may be a non-linear effect of the masking procedure on the coefficients generated in subsequent iterations. If T is chosen to be an over-complete transform, then it may be sufficient to take $T_i=T$ for all i since matching pursuit with over-complete transforms may already have a non-linear effect on the coefficients of each subsequent iteration.

Where K=1, no dissipation occurs. The lack of dissipation may be referred to as "without function dissipation." Only N=1 masks are used. The largest M=5,000 wavelet coefficients in step (E2) may be gathered. The first three moments of these coefficients may be computed.

A three dimensional feature vector may be extracted for each droplet with the addition of each protein and each amino acid. Like the binary coding experiments, extraction may be performed on relatively small size images to speed up the algorithm. A general purpose classification algorithm may be applied to the output of (E1)-(E3). For example, a linear discriminant analysis classifier may be applied.

The algorithm may be tested by dividing the 20 instances of feature vectors randomly into a training set of 15 instances and a test set of 5 instances. The classifier (such as a linear discriminant analysis classifier) may be trained on the training set. Then it may be tested with the remaining 5 instances. Because it may be useful to identify each protein and control reporters as well, the total number of classes to discriminate is 5 (i.e., the four proteins and Water).

The process may be repeated (e.g., 10,000 times), using different divisions into training and testing sets to obtain estimations of misclassification error rates for each class. If only one amino acid is used, the algorithm may be unable to classify the proteins with any reasonable degree of accuracy.

The average error rate for the four test proteins is about 0.1288 if only A2 is used. Where only A7 is used, the average error rate is about 0.1629. Where only A13 is used, the average error rate is about 0.2118. Where only A17 is used, the average error rate is about 0.2650.

If dissipation (i.e., K=1) is not allowed even when N>1 masks are used, no strong classification results may be obtained.

In the case where all four amino acids in the classification scheme is used by randomly stringing together moment vectors for droplets of a given protein and for all available amino acids, twenty 12N-dimensional vectors may be obtained, since four amino acids are used. N may be set to 1. Under these conditions, the average misclassification error can be about 0.0055 with a maximum misclassification error (achieved for P3) of about 0.0078. The performance of the algorithm may be improved by at least an order of magnitude with respect to the case in which only single amino acids are used. Moreover, it is likely that P2 and P10 would not be misclassified as Water, whereas P1 and P3 may be misclassified as Water with a frequency about <0.0018.

Where K>1, dissipation should occur and may be referred to as "with function dissipation." By setting K>1 (e.g., 5), the function dissipation technique is turned on. This technique corresponds to a situation in which only a limited number of amino acids is available. In these experiments, N random functions (e.g., N=40, N=80, etc.) were selected for $A_n$, where n=1, ..., N and is defined on IR. Then, for each $A_n$, steps (E1)-(E3) may be applied using the set number of techniques. At each iteration, M=1,000 coefficients may be extracted. If steps (E1)-(E3) for each masking An are repeated, what may be obtained is a 3N-dimensional feature vector for each image droplet with the addition of a single amino acid (or a 12N-dimensional feature vector V when droplets associated to each protein for different amino acids are strung together).

Figure 11:
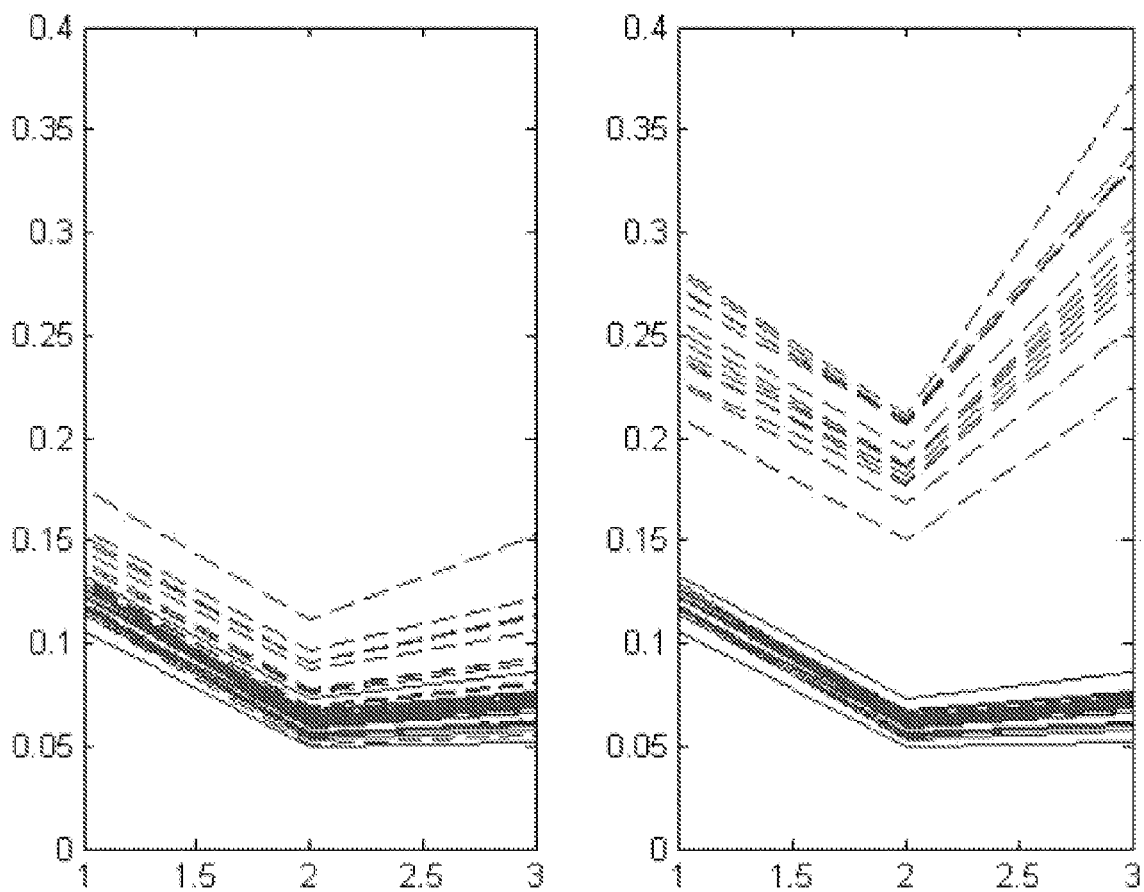
FIG. 11 shows an example of marginal separation of moments and full separation of moments.

In FIG. 11, the left graph shows the 3 moments associated to one specific mask for the 20 instances of A1 plus P10, and the 20 instances of A2 plus P2. The left graph shows there is only a marginal separation between these classes for this specific mask.

The right graph of FIG. 11 shows the 3 moments for the 20 instances of A1 plus P10, and the 20 instances of A2 plus Water. Full separation between the two classes for all three moments may be observed.

As above, the use of many masks allows users to look at data from many different (albeit unstructured) view points in line with microarray approach. In functional dissipation, each of the elements of the feature vector may be referred to as "dissipative gene" (also referred to herein as "dissipative feature"). When the resulting dissipative genes are displayed in several columns, wherein each column may represent the dissipative genes for one instance of a protein or Water, the resulting array may be referred to as a "dissipative functional microarray," as exemplified in FIG. 12.

Figure 12:
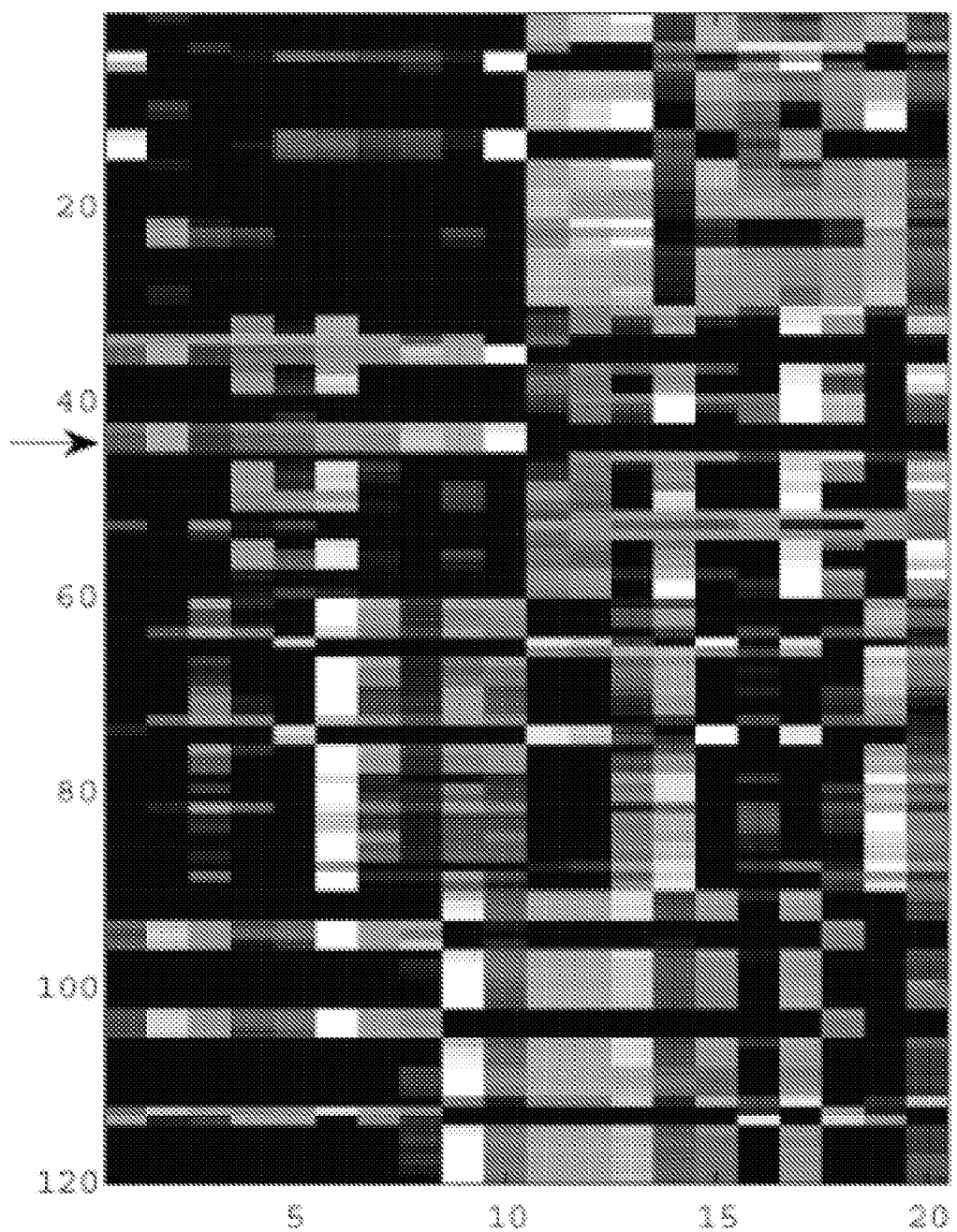
FIG. 12 shows an example of a dissipative functional microarray.

FIG. 12 shows from left to right 10 instances of gene column vectors for A2 plus P1 (of length 120; i.e., 3N with N=40) and 10 instances for A2 with Water. It may be noted that this specific dissipative functional microarray implemented with wavelet transforms may show a distinct behavior for P1 droplets and Water droplets for many genes.

Again, the algorithm may be tested by dividing the 20 instances of feature vectors for each class randomly into a training set of 15 instances and a test set of 5 instances. The classification scheme may be repeated 10,000 times for each random splitting of the instances.

A subset of random genes (or "random features") may bring great improvement in the misclassification error rates. This improvement may even be true when the feature vectors are derived by the crystallization patterns of a single amino acid reporter. More particularly, given each amino acid reporter, the best k genes (e.g., k=12) may be selected for which the ratio of between class variance over within-class variance for the training sets may be maximal. Such choice may result in very small average errors of misclassification: $<10^{-4}$ for using only A2; about 0.0013 for A7; about 0.0009 for A13; and about 0.0027 for A17. It should be noted that no good classification results may occur where only the masks are applied, without dissipation, even if N>1 masks are used. This evidence shows further proof of the significance and necessity of the functional dissipation step.

For linear discriminant analysis classifiers, the quality of the classification results do not seem to be affected significantly by the choice of the number k of dissipative genes, as long as care is taken not to make the linear discriminant classifier ill-conditioned by taking k too large.

B. Binary Coding

The same experimental elements are used herein (i.e., proteins P1, P2, P3, P10; amino acids A2, A7, A13, A17; and Water). Because of the added information for each protein that is given by mixing with several amino acids, a very basic wavelet feature extraction algorithm may be sufficient to roughly discriminate the patterns for each amino acid addition by comparing the binary coding associated to each protein. The functional dissipation step may be used to maximize the information derived from each amino acid addition and to increase the length of the binary code for each protein.

It is interesting to note that, supposedly, a weakness of matching pursuit is its inability, as a greedy algorithm, to find an optimal representation for a given signal. However, the use of randomization and dissipation may turn this weakness into a strength (for applications such as classification or event detection problems). This change of perspective is in line with the idea that greedy matching pursuit methods have a greater potential than simply being approximations to optimal solutions.

It is also interesting to note that the dissipative functional microarrays of steps (E1)-(E3) may be used as a preprocessing stage for any classification scheme in addition to the linear discriminant analysis scheme used in this invention.

The foregoing descriptions of the embodiments of the invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the invention and its practical application to thereby enable others skilled in the art to best utilize it in various embodiments and with various modifications as are suited to the particular use contemplated without departing from the spirit and scope of the invention. In fact, after reading the above description, it will be apparent to one skilled in the relevant art(s) how to implement the invention in alternative embodiments. Thus, the invention should not be limited by any of the above described example embodiments. For example, the invention may be practiced over forensics.

In addition, it should be understood that any figures, graphs, tables, examples, etc., which highlight the functionality and advantages of the invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical invention of the application. The Abstract is not intended to be limiting as to the scope of the invention in any way.

Furthermore, it is the applicants' intent that only claims that include the express language "means for" or "step for" be interpreted under 35 U.S.C. § 112, paragraph 6. Claims that do not expressly include the phrase "means for" or "step for" are not to be interpreted under 35 U.S.C. § 112, paragraph 6.

A portion of the invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

What is claimed is:

1. A tangible computer readable medium encoded with feature enhancement and classification instructions, executable by a machine under the control of a program of instructions, in which said machine includes a memory storing a program, wherein execution of said instructions by one or more processors causes said one or more processors to perform a multitude of steps comprising:
   a. selecting a classifier and a figure of merit for quantifying classification quality;
   b. selecting a transform to generate features from input data;
   c. using a recursive process of functional dissipation to generate dissipative features from said features generated according to said transform;
   d. computing said figure of merit for all of said dissipative feature generated;
   e. searching for at least one of said dissipative features that maximize said figure of merit on a training set; and
   f. classifying a test set with said classifier by using said at least one of said dissipative features.

2. A tangible computer readable medium according to claim 1, wherein said functional dissipation comprises:
   a. selecting a number of iterations;
   b. setting a number of largest features;
   c. setting a recursive input to be an instance of said input data;
   d. setting a collection of features as an empty set;
   e. according to said number of iterations, iteratively,
      i. generating said features of said recursive input using said transform;
      ii. selecting said largest features computed by said transform based upon said number of largest features;
      iii. adding said largest features to said collection of features;
      iv. generating modified features by applying a mask to modify said largest features; and
      v. setting said recursive input to be the inverse transform of modified features; and
   f. computing said dissipative features using statistics describing the probability distribution of said collection of features.

3. A tangible computer readable medium according to claim 2, wherein said statistics are at least one statistical moment.

4. A tangible computer readable medium according to claim 1, wherein said transform alternates between at least two discrete wavelet transforms, each of said at least two discrete wavelet transforms having a different mother wavelet.

5. A tangible computer readable medium according to claim 2, wherein said functional dissipation is repeated at least once for a multitude of mask, said mask being randomly selected.

6. A tangible computer readable medium according to claim 2, wherein said mask is a realization of a low variance Gaussian white noise convolved with low-pass filters of different frequency supports.

7. A tangible computer readable medium according to claim 1, wherein said classifier is one of the following:
   a. a linear discriminant analysis classifier;
   b. a support vector machine;
   c. a nearest neighborhood classifier; and
   d. a neural network.

8. A tangible computer readable medium according to claim 1, wherein said classifier includes binary coding, said binary coding attaching to each data class:
   a. a value of "1" if said dissipative features of said input data belonging to said data class are significantly different from those of a control data class; and
   b. a value of "0" otherwise.

9. A tangible computer readable medium according to claim 1, wherein said input data is high resolution, texture-rich data capable of being divided into said training set and said test set.

10. A feature enhancement and classification system comprising:
    a. a classifier, said classifier configured to quantify classification quality;
    b. a figure of merit, said figure of merit configured to quantify classification quality;
    c. a transform selector, said transform selector configured to select a transform to generate features from input data;
    d. a functional dissipative recursive processor, functional dissipative recursive processor configured to generate dissipative features from said features generated according to said transform;
    e. a figure of merit computational component, said figure of merit computational component configured for computing said figure of merit for all of said dissipative features generated;
    f. a dissipative features searcher, said dissipative features searcher configured to search for at least one of said dissipative features that maximize said figure of merit on a training set; and
    g. a test set classifier, said test set classifier configured to classify a test set with said classifier by using said at least one of said dissipative features.

11. A system according to claim 10, wherein said functional dissipative recursive processor comprises:
    a. an iteration selector, said iteration selector configured to select a number of iterations;
    b. a number of largest features setter, said number of largest features setter configured to set a number of largest features;
    c. a recursive input setter, said recursive input setter configured to set a recursive input to be an instance of said input data;
    d. a collection of features setter, said collection of features setter configured to set a collection of features as an empty set;
    e. a features generator, said features generator configured to generate features of said recursive input using said transform;
    f. a largest features selector, said largest features selector configured to select said largest features computed by said transform based upon said number of largest features;
    g. an adder, said adder configured to add said largest features to said collection of features;
    h. a modified features generator, said modified features generator configured to generate modified features by applying a mask to modify said largest features; and
    i. a dissipative features computational component, said dissipative features computational component configured to compute said dissipative features using statistics describing the probability distribution of said collection of features.

12. A system according to claim 11, wherein said statistics are at least one statistical moment.

13. A system according to claim 10, wherein said transform alternates between at least two discrete wavelet transforms, each of said at least two discrete wavelet transforms having a different mother wavelet.

14. A system according to claim 11, wherein said functional dissipation is repeated at least once for a multitude of said mask, said mask being randomly selected.

15. A system according to claim 11, wherein said mask is a realization of a low variance Gaussian white noise convolved with low-pass filters of different frequency supports.

16. A system according to claim 10, wherein said classifier is one of the following:
    a. a linear discriminant analysis classifier;
    b. a support vector machine;
    c. a nearest neighborhood classifier; and
    d. a neural network.

17. A system according to claim 10, wherein said classifier includes binary coding, said binary coding attaching to each data class:
    a. a value of "1" if said dissipative features of said input data belonging to said data class are significantly different from those of a control data class; and
    b. a value of "0" otherwise.

18. A system according to claim 10, wherein said input data is high resolution, texture-rich data capable of being divided into said training set and said test set.

* * * * *